United States Patent [19]

Nakagawa et al.

[11] Patent Number: 5,112,679
[45] Date of Patent: May 12, 1992

[54] MAGNETIC DISK

[75] Inventors: Jun Nakagawa; Toshio Kawamata; Kunihiko Sano, all of Kanagawa, Japan

[73] Assignee: Fuji Photo Film Co., Ltd., Kanagawa, Japan

[21] Appl. No.: 419,361

[22] Filed: Oct. 10, 1989

[30] Foreign Application Priority Data

Oct. 13, 1988 [JP] Japan .................. 63-257660

[51] Int. Cl.$^5$ ............................. G11B 23/00
[52] U.S. Cl. .................. 428/323; 428/694; 428/695; 428/900
[58] Field of Search ............ 428/694, 695, 900, 323

[56] References Cited

U.S. PATENT DOCUMENTS

| | | | |
|---|---|---|---|
| 4,675,250 | 6/1987 | Kanai et al. | 428/695 |
| 4,731,292 | 3/1988 | Sasaki et al. | 428/695 |
| 4,772,522 | 9/1988 | Kubota et al. | 428/695 |
| 4,786,544 | 11/1988 | Saito | 428/695 |
| 4,786,551 | 11/1988 | Ootani et al. | 428/695 |

Primary Examiner—Paul J. Thibodeau
Attorney, Agent, or Firm—Sughrue, Mion, Zinn, Macpeak & Seas

[57] ABSTRACT

A magnetic disk comprising a non-magnetic support having provided thereon a magnetic layer comprising ferromagnetic particles, and a binder resin, wherein said magnetic layer is such that when sputtering is conducted on said magnetic layer from the surface of the magnetic layer in the direction of the depth of the magnetic layer by the Auger electron spectroscopic method, and the concentration of carbon atoms resulting from the sputtering is measured, a sputtering time ($T_1$) required for the carbon atom concentration to be $(C_0+C_2)/2$ is in the range of from 8 to 98 minutes, wherein $C_0$ is a carbon atom concentration value obtained at the initiation of the sputtering and $C_2$ is a carbon atom concentration value after the carbon atom concentration becomes constant.

6 Claims, 1 Drawing Sheet

FIGURE
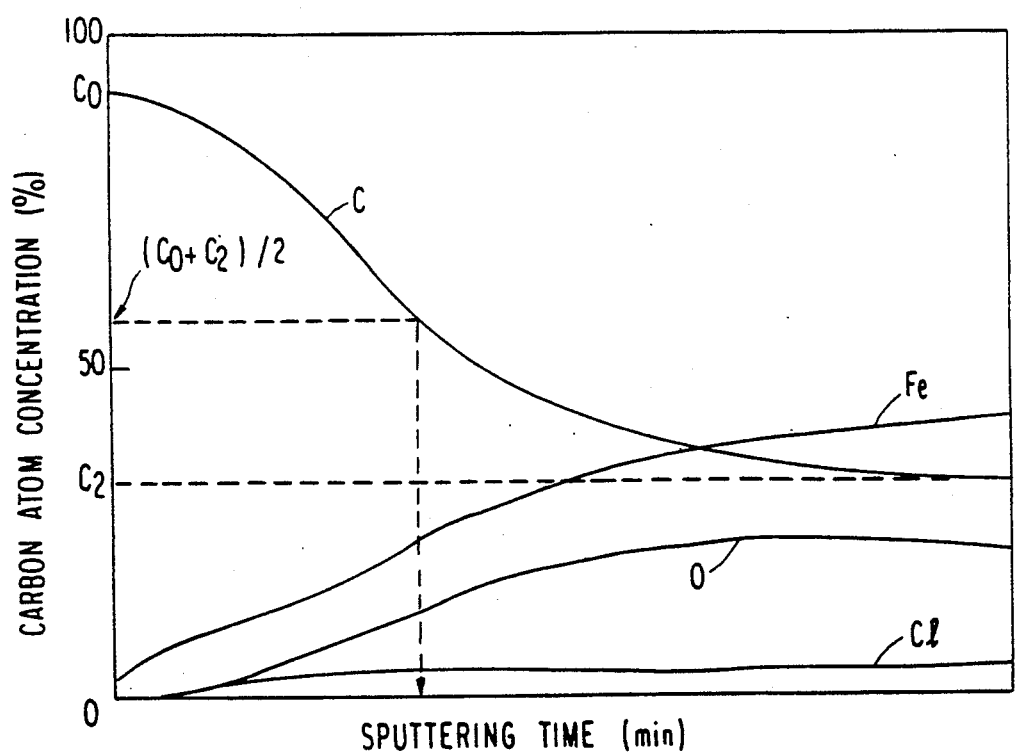

MAGNETIC DISK

FIELD OF THE INVENTION

This invention relates to a magnetic disk comprising a non-magnetic support having provided thereon a magnetic layer comprising ferromagnetic particles and a binder resin. More particularly, the present invention is concerned with a magnetic disk which is especially suitable for high-density recording and has an improved running durability.

BACKGROUND OF THE INVENTION

In recent years, there has been a desire for a magnetic disk or sheet having excellent electromagnetic characteristics and which is suitable for high-density recording.

For the purpose of making magnetic disks suitable for high-density recording, ferromagnetic particles having small particle sizes are used, the surfaces of magnetic layers are made smooth or ferromagnetic particles are more uniformly dispersed in magnetic layers. Various methods are employed for these purposes. Further, in magnetic disks for high-density recording, the magnetic layers are becoming thinner. The production of magnetic disks for high-density recording by the above-described methods has caused problems in terms of the running durability of the thus-produced magnetic disks. That is, since such magnetic layers have smoother surfaces, the coefficients of the friction between the magnetic layers during running and the parts in recording and reproducing devices become so high that smooth running of the magnetic recording media is often inhibited or the magnetic layers are apt to suffer damage.

Furthermore, with the spread of VTR's, personal computers, word processors, etc., among the general public, the conditions, particularly, the temperature and humidity under which magnetic recording media are used, have a wide range of variability. Therefore, the above-described problem of running durability has become serious for rotary recording media, such as floppy disks for personal computers, word processors or the like, whose magnetic layers are subjected to repeated head-on-off operations, especially when such operations are conducted for a long period of time at high temperatures or under conditions of cyclically varying temperatures, from high temperatures to low temperatures.

In order to overcome the above problems, the following methods have been proposed: a method in which fatty acid esters are incorporated in the magnetic layers as disclosed in, for example, JP-A-50-22603, JP-A-50-153905, JP-A-55-139637, JP-B-39-28367, JP-B-41-18065 and JP-B-47-12950, a method in which a silicone compound is incorporated in the magnetic layers as disclosed in, for example, U.S. Pat. No. 2,654,681, and a method in which a fatty acid or a hydrocarbon is incorporated in the magnetic layers as discolored in, for example, U.S. Pat. Nos. 4,522,885, 4,711,673, 4,420,540, 3,634,253 and 4,548,873. (The terms "JP-A" and "JP-B" as used herein mean an "unexamined published Japanese patent application" and an "examined Japanese patent publication", respectively.)

However, the recording media produced by these prior art methods have a problem in that the above-described additives contained in the surface parts of the magnetic layers tend to vaporize at high temperatures, while the additives separate out on the surfaces of the magnetic layers at low temperatures, causing clogging of heads or frequent dropouts. Further, there is another problem in that in the case where the amount of the additive is increased to further improve the running durability, the additive undesirably plasticizes the binder resin and thus lowers the strength of the magnetic layer, whereby the durability becomes worse rather than improved.

In the case where ester compounds having a straight-chain alkyl group, which show relatively good lubricating properties, are used, they often cause the above-described problem that they separate out on the surfaces of the magnetic layers at low temperatures, because many of these have high melting points.

In attempts to overcome these problems, JP-B-47-12950, JP-A-58-160425, JP-A-58-218038, JP-A-60-205827, JP-A-61-294637 and JP-A-62-125529 disclose methods in which fatty acid esters having either a high-molecular-weight and branched hydrocarbon group or an unsaturated hydrocarbon group are incorporated in the magnetic layers, so that the fatty acid esters do not readily vaporize from the magnetic layers even at high temperatures and do not separate out on the magnetic layer surfaces at low temperatures. However, these esters cannot produce sufficient effects, since they plasticize the binder resins and thus lower the strength of the magnetic layers because they are liquid at room temperature and compatible with the binder resins. Moreover, the ester compounds having a branched alkyl group are also disadvantageous in that their lubricating properties are insufficient.

SUMMARY OF THE INVENTION

Accordingly, an object of the present invention to provide a magnetic disk which shows excellent running durability, particularly over wide temperature and humidity ranges.

The magnetic disk according to the present invention comprising a non-magnetic support having provided thereon a magnetic layer comprising ferromagnetic particles, a binder resin, and a lubricating agent wherein the magnetic layer is characterized in that when sputtering is conducted on the magnetic layer from the surface of the magnetic layer in the direction of the depth of the magnetic layer by the Auger electron spectroscopic method and the concentration of carbon atoms resulting from the sputtering is measured, a sputtering time ($T_1$) required for the carbon atom concentration to be $(C_O + C_2)/2$ is in the range of from 8 to 98 minutes, wherein $C_O$ is a carbon atom concentration value obtained at the initiation of the sputtering and $C_2$ is a carbon atom concentration value after the carbon atom concentration becomes constant.

BRIEF DESCRIPTION OF THE DRAWING

The Figure is a graph showing the changes in sputtering time versus the atom concentrations for various elements in the direction of the depth from the surface of the magnetic layer of a magnetic disk according to this invention.

DETAILED DESCRIPTION OF THE INVENTION

In this invention, the sputtering by the Auger electron spectroscopic method is conducted by using, for example, the Auger electron spectroscope PHI 560 (manufactured by PERKIN ELMER Company). Conditions therefor are as follows: the electron beam-accelerating voltage is 3 kV and the beam current density is 200 mA/cm². When sputtering is conducted in the direction of the depth of the magnetic layer, the Ar⁺ ion beam-accelerating voltage is 3 kV and the beam current density is 5 μA/cm². The concentrations of atoms of elements C, Cl, O and Fe are determined by measuring the Auger spectra of $C_{1s}$, $Cl_{1s}$, $O_{1s}$ and $Fe_{2p}$ by means of an integrating sphere, subjecting the spectral data to five-stage differentiation, reading the heights of the spectra of the respective elements (C, Cl, O and Fe), and then correcting the height values with coefficients, 0.180, 1.100, 0.500 and 0.182, respectively. The above-described measurements of Auger spectra are initiated 10 minutes after the evacuation of the sample chamber.

When magnetic disks of this invention are sputtered by the Auger electron spectroscopic method under the above conditions, with the sputtering being conducted from the surface of the magnetic layer in the direction of the depth of the magnetic layer, the relationship between the sputtering time and the concentration of atoms of each element is in many cases that shown in the Figure. In the Figure, the carbon atom concentration (shown as curve C) is maximum ($C_o$) at the time of the initiation of the sputtering. As the sputtering proceeds, it continuously decreases and finally reaches a constant value ($C_2$) after a certain period of sputtering. The concentrations of Fe (derived from the magnetic particles) and O increase continuously, while that of Cl shows little change. Sputtering time $T_1$, which is a sputtering time required for the carbon atom concentration to be an intermediate value, i.e., ($C_O+C_2/2$), has a close relationship with the running durability of the magnetic disk. In the case where a magnetic disk has a $T_1$ in the range of from 8 to 98 minutes, as in the magnetic disk of this invention, and preferably from 17 to 74 minutes, the magnetic disk shows excellent running durability. Too small or too large $T_1$ values never result in sufficient running durability.

It can be thought that the sputtering time corresponds to the distance (depth) from the surface of the magnetic layer. That is, it may be assumed that the time (0 minute) when the sputtering is initiated corresponds to the surface of the magnetic layer, and the time when the carbon atom concentration becomes constant corresponds to a depth of about several-ten to several-hundred angstroms from the surface of the magnetic layer.

Therefore, in this invention, how the carbon atom concentration changes in a limited depth which extends to a place several-hundred angstroms at most away from the surface of the magnetic layer greatly affects the running durability of the magnetic disk.

The carbon atoms determined by the Auger electron spectroscopic method as described above are attributable to various materials contained in the magnetic layer, particularly organic materials such as a binder resin, a lubricating agent and carbon black. Of these, a lubricating agent, particularly the kind thereof, exerts a considerable influence when a magnetic layer exhibits the above-described change in carbon atom concentration with depth, so as to produce a magnetic disk of this invention. The Figure is a graph showing the atom concentrations for respective elements, in the case where a vinyl chloride-based polymer is used as a binder resin. In the Figure, the concentration of Cl atoms shows little change, suggesting that the change in carbon atom concentration is not attributable to at least the binder resin.

Lubricating agents useful for obtaining the magnetic disk of the present invention are ester compounds which have a molecular weight of 430 or more, preferably 450-760, and have an unsaturated bond or a branched structure in their acid residues or alcohol residues. Particularly preferred examples thereof are:

an ester compound represented by the following formula (I) which has a methyl group, as a side group, in its alcohol residue

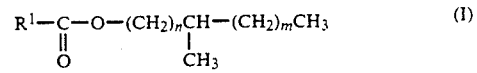

wherein $R^1$ represents a straight-chain or branched alkyl or alkenyl group having 7 to 29 carbon atoms, n is an integer of 2 or larger and m is an integer, provided that the sum of n and m is from 7 to 33;

an ester compound represented by the following formula (II) which has a side group at the second position in its alcohol residue

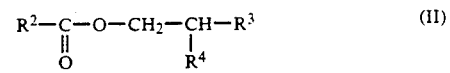

wherein $R^2$ represents a straight-chain or branched alkyl or alkenyl group having 15 to 29 carbon atoms, and $R^3$ and $R^4$ each represents an alkyl group, provided that the sum of carbon atoms contained in $R^3$ and $R^4$ is from 14 to 20;

an ester compound represented by the following formula (III) which has been obtained through the reaction of a straight-chain or branched fatty acid having 12 to 30 carbon atoms with a branched alcohol having 10 to 32 carbon atoms and synthesized by the oxo process

wherein $R^5$ represents a straight-chain or branched alkyl or alkenyl group having 11 to 29 carbon atoms, and $R^6$ represents a branched alkyl group having 10 to 32 carbon atoms; and esters of fatty acids with unsaturated alcohols.

As compared with conventional lubricating agents, the above ester compounds are unevenly distributed in the magnetic layers of magnetic disks, with their concentrations being highest at the surfaces of the magnetic layers. The changes of the carbon atom concentrations with the depth from the surfaces of these magnetic layers are apt to be that as shown in the Figure. Because of the above, even if these magnetic disks are run for a prolonged period of time, these lubricating agents are always present on the surfaces of the magnetic layers in sufficient amounts, so that good running properties can be maintained. Further, the above-mentioned ester compounds are effective in making the magnetic disk of this invention and show improved running durability over wide temperature and humidity ranges. This is because these ester compounds never separate out on the surface of the magnetic layer at low temperatures and there is only little fear of the vaporization of these ester compounds from the magnetic layer at high temperatures, due to their structural features such as the appropriate molecular sizes, and the presence of a branched structure or an unsaturated bond.

Specific examples of these ester compounds include isodecyltetradecyl laurate, isomyristyl laurate, isostearyl laurate, isoundecyl laurate, isopalmityl myristate, isobehenyl myristate, isopalmityl palmitate, isostearyl palmitate, isostearyl oleate, isopalmityl oleate, isomyristyl stearate, isopalmityl stearate, isostearyl stearate, isobehenyl stearate, isomyristyl behenate, isostearyl behenate, isomyristyl montanate, isostearyl montanate, (the "iso" used above means the presence of a methyl group as a side group), an ester containing an acid residue which is either an alkyl group (for example, straight-chain or branched octadecyl, nonadecyl, eicosyl, heneicosyl, docosyl, tricosyl, tetracosyl, tetratriacontyl) or an alkenyl group (for example, octadecenyl, nonadecenyl, eicosenyl, heneicosenyl, docosenyl, tricosenyl, tetracosenyl) and an alcohol residue (for example, 2-hexyldecyl, 2-heptylundecyl, 2-octyldodecyl), isomyristyl laurate, isostearyl laurate, isodecyltetradecyl laurate, isoundecyl laurate, isopalmityl myristate, isobehenyl myristate, isopalmityl palmitate, isostearyl palmitate, isopalmityl oleate, isostearyl oleate, isomyristyl stearate, isopalmityl stearate, isostearyl stearate, isobehenyl stearate, isomyristyl behenate, isostearyl behenate, isomyristyl montanate, isostearyl montanate, (the "iso" used above means the presence of a branched structure formed by the oxo process), erucyl caproate, oleyl caproate, elaidyl caproate, palmitoleyl caproate, undecylenyl caproate, erucyl decanoate, oleyl decanoate, elaidyl decanoate, palmitoleyl decanoate, undecylenyl decanoate, erucyl laurate, oleyl laurate, elaidyl laurate, palmitoleyl laurate, undecylenyl laurate, erucyl myristate, oleyl myristate, elaidyl myristate, palmitoleyl myristate, undecylenyl myristate, erucyl stearate, oleyl stearate, elaidyl stearate, palmitoleyl stearate, undecylenyl stearate, erucyl behenate, oleyl behenate, elaidyl behenate, palmitoleyl behenate, undecylenyl behenate, erucyl isostearate, oleyl isostearate, elaidyl isostearate, palmitoleyl isostearate, undecylenyl isostearate, erucyl isomyristate, oleyl isomyristate, elaidyl isomyristate, palmitoleyl isomyristate and undecylenyl isomyristate.

Particularly effective of these are erucyl caproate, erucyl decanoate, oleyl decanoate, elaidyl decanoate, erucyl laurate, oleyl laurate, elaidyl laurate, palmitoleyl laurate, erucyl myristate, oleyl myristate, elaidyl myristate, palmitoleyl myristate, undecylenyl myristate, erucyl stearate, oleyl stearate, elaidyl stearate, palmitoleyl stearate, undecylenyl stearate, erucyl behenate, oleyl behenate, elaidyl behenate, palmitoleyl behenate, undecylenyl behenate, erucyl isostearate, oleyl isostearate, elaidyl isostearate, palmitoleyl isostearate, undecylenyl isostearate, erucyl isomyristate, oleyl isomyristate, elaidyl isomyristate, palmitoleyl isomyristate and undecylenyl isomyristate.

Particularly preferred of these are isostearyl stearate, isostearyl palmitate, 2-hexyldecyl stearate, 2-heptylundecyl stearate, 2-hexyldecyl behenate, 2-hexyldecyl montanate, 2-heptylundecyl archinate, 2-heptylundecyl behenate and octyldodecyl stearate. Most preferred are 2-hexyldecyl stearate, isostearyl stearate, isostearyl palmitate, isopalmityl stearate, isostearyl behenate and oleyl stearate.

In addition to the above-described ester compounds, conventional lubricating agents may also be used to prepare the magnetic disk of this invention. For example, there are the following compounds: metallic soaps prepared from saturated or unsaturated fatty acids (such as myristic acid, stearic acid and oleic acid), amides of fatty acids, fatty acid esters (including various kinds of monoesters, fatty acid esters of polyhydric alcohols such as sorbitan and glycerin, and esters of polybasic acids), higher aliphatic alcohols, monoalkyl phosphates, dialkyl phosphates, trialkyl phosphates, paraffins, silicone oil, animal oil, vegetable oil, mineral oil, higher aliphatic amines; an inorganic fine powder of graphite, silica, molybdenum disulfide or tungsten disulfide; a resin fine powder of polyethylene, polypropylene, polyvinyl chloride, an ethylene-vinyl chloride copolymer or polytetrafluoroethylene; $\alpha$-olefin polymers; room temperature-liquid unsaturated aliphatic hydrocarbons, and fluorocarbons.

For heightening the effect of such a lubricating agent, it is effective to control the conditions under which coating fluids for forming magnetic layers are applied and dried.

In the magnetic disk of the present invention, the magnetic layer has a smooth surface. For example, an average center line roughness (cut-off value 0.25 $\mu$m) of 0.01 $\mu$m or less is very effective in improving running durability, particularly the running durability over wide ambient condition ranges, including a wide temperature range from a high temperature to a low temperature. Further, in the case where the ferromagnetic particles are ferromagnetic metal particles having a specific surface area of 30 $m^2/g$ or more, preferably 40 $m^2/g$ or more, a considerable effect can also be produced.

The amount of the above-described lubricating agent incorporated is from 1 to 25 wt %, preferably 5 to 20 wt %, based on the weight of the ferromagnetic particles, in the case where the lubricating agent is an ester having a molecular weight of less than 430. In the case where the lubricating agent incorporated is an ester having a molecular weight of 430 or more, its amount is from 1 to 20 wt %, preferably to 20 wt %, based on the weight of the ferromagnetic particles. In the case where the lubricating agent is coated on the surface of the magnetic layer to produce a top-coated magnetic recording medium, the amount of the lubricating agent applied is from 2 to 50 $mg/m^2$, preferably 10 to 30 $mg/m^2$.

Ferromagnetic particles used to prepare a magnetic disk according to this invention are not particularly limited, and, for example, ferromagnetic alloy particles, $\alpha$-$Fe_2O_3$, $Fe_3O_4$, Co-modified iron oxide, $CoO_2$, iron nitride, modified barium ferrite and modified strontium ferrite can be used.

The shape of the ferromagnetic particles is not particularly limited, but is generally a circular, particulate, cubical or flat, or the shape of a grain of rice. The specific surface area of the ferromagnetic particles is preferably 20 $m^2/g$ or more, more preferably 25 to 40 $m^2/g$, from the standpoint of electromagnetic characteristics.

A binder which constitutes part of the magnetic layer can be selected from conventional binders. Examples of the binder are a vinyl chloride-vinyl acetate copolymer, a copolymer of vinyl chloride, vinyl acetate, vinyl alcohol, maleic acid and/or acrylic acid, a vinyl chloride-vinylidene chloride copolymer, a vinyl chloride-acrylonitrile copolymer, an ethylene-vinyl acetate copolymer, cellulose derivatives such as a nitrocellulose resin, an acrylic resin, a polyvinyl acetal resin, a polyvinyl butyral resin, an epoxy resin, a phenoxy resin, a polyurethane resin and a polycarbonate polyurethane resin. For further improving the dispersibility of the ferromagnetic particles and the durability of the resulting magnetic disk, it is preferred for the above-described binders to have in their molecules a polar group (epoxy, $CO_2H$, OH, $NH_2$, $SO_3M$, $OSO_3M$, PO$_3$M$_2$; wherein M represents hydrogen, an alkali metal or ammonium, provided that where one group contains plural M's, they may be the same or different). The content of such a polar group in the binder is preferably in the range of from $1 \times 10^{-6}$ to $1 \times 10^{-4}$ equivalent, more preferably $6 \times 10^{-5}$ to $10^{-4}$, per gram of the binder polymer.

The above-described polymer binders may be used alone or in combination of two or more thereof. The binder is often combined with a conventional isocyanate-type crosslinking agent for curing.

Further, an acrylic ester oligomer and monomer can be used as a binder which cures upon exposure to radiation, and the ester compound as described hereinbefore can be applied to this binder system.

The non-magnetic support is made of a resin material. Examples thereof include polyesters such as polyethylene terephthalate and polyethylene-2,6-naphthalate, polyolefins such as polyethylene and polypropylene, cellulose derivatives such as cellulose triacetate, polycarbonates, polyimides and polyamide-imides. According to need, the resinous non-magnetic support may be metallized with a metal such as aluminum.

The thickness of the non-magnetic support is generally in the range of from 3 to 100 μm, preferably from 20 to 100 μm.

In the magnetic disk of this invention, the total amount of the binder contained in the magnetic layer is generally from 10 to 100 parts by weight, preferably from 20 to 40 parts by weight, per 100 parts by weight of the ferromagnetic particles.

It is preferred that the magnetic layer of the magnetic disk of this invention further contains inorganic particles having a Mohs' hardness of 5 or more.

Inorganic particles which can be used in this invention are not particularly limited so long as their Mohs' hardnesses are 5 or more. Examples of the inorganic particles having a Mohs' hardness of 5 or more include Al$_2$O$_3$ (Mohs' hardness 9), TiO (Mohs' hardness 6), TiO$_2$ (Mohs' hardness 6.5), SiO$_2$ (Mohs hardness 7), SnO$_2$ (Mohs' hardness 6.5), Cr$_2$O$_3$ (Mohs' hardness 9) and α-Fe$_2$O$_3$ (Mohs' hardness 5.5). These may be used alone or in combination.

Especially preferred are inorganic particles having a Mohs, hardness of 8 or more. If relatively soft inorganic particles having a Mohs' hardness below 5 are used, not only do the inorganic particles tend to fall from the resulting magnetic layer, but also clogging of the heads tends to occur because the thus-obtained magnetic layer has almost no head-abrading effect. Thus, the running durability becomes poor.

The content of the above inorganic particles in the magnetic layer is generally in the range of from 0.1 to 20 parts by weight, preferably from 1 to 10 parts by weight, per 100 parts by weight of the ferromagnetic particles.

In addition to the above-described inorganic particles, carbon black (particularly one having an average particle diameter of from 10 to 300 nm, preferably 20 to 200 nm (1 nanometer = $10^{-9}$ m)) may be preferably incorporated in the magnetic layer.

A method for preparing the magnetic disk of this invention will be described below.

First, the ferromagnetic particles, the binder and the above-described ester compound, and if desired and necessary, other fillers and additives, are kneaded together with a solvent, thereby to prepare a magnetic coating composition. The solvent used in the kneading may be one which is usually used in preparing conventional magnetic coating compositions.

The method for kneading is not particularly limited, and the order of the introduction of the components is suitably determined.

Conventional additives such as a dispersing agent, an antistatic agent and a lubricating agent can also be used in preparing the magnetic coating composition.

Examples of the dispersing agent are the following conventional dispersing agents: fatty acids having 12 to 22 carbon atoms, salts or esters thereof, compounds obtained by substituting part or all of the hydrogen atoms in the salts or esters with fluorine atoms, amides of the above-described fatty acids, aliphatic amines, higher alcohols, polyalkylene-oxidoalkyl esters of phosphoric acid, alkyl esters of phosphoric acid, alkyl esters of boric acid, sarcosinates, alkyl ether esters, trialkyl polyolefins, oxy quaternary ammonium salts, and lecithin.

In the case where a dispersing agent is used, the amount thereof is generally in the range of from 0.1 to 10 parts by weight per 100 parts by weight of the ferromagnetic particles used.

Examples of the antistatic agent are electrically conductive fine particles such as carbon black or carbon black graft polymer particles; natural surface active agents such as saponin; nonionic surface active agents of, for example, the alkylene oxide type, the glycerin type or the glycidol type; cationic surface active agents such as (higher alkyl)amines, quaternary ammonium salts, salts of heterocyclic compounds such as pyridine, and phosphonium or sulfonium compounds; anionic surface active agents containing an acid radical such as a carboxylic acid, phosphoric acid, sulfate or phosphate radical; and ampholytic surface active agents such as amino acids, aminosulfonic acids, and esters of sulfuric or phosphoric acid with amino-alcohols. In the case where the above-described electrically conductive fine particles are used as an antistatic agent, the amount thereof is, for example, in the range of from 0.1 to 20 parts by weight per 100 parts by weight of the ferromagnetic particles. Where a surface active agent is used, it is used in an amount of from 0.12 to 10 parts by weight per 100 parts by weight of the ferromagnetic particles.

Each of the above-described dispersing agents, antistatic agents, lubricating agents and other additives should not be construed as always having just one function that the name implies. For example, a dispersing agent may act also as a lubricating agent or an antistatic agent. Therefore, effects brought about by or expected from the respective additives are, of course, not limited to the effects implied by the names of these additives. Further, in the case where an additive having plural functions is used, it is preferred that the amount of the additive used is determined, taking all these functions into consideration.

The thus-prepared magnetic coating composition is coated on the above-described non-magnetic support. The coating may be done directly on the non-magnetic support. Alternatively, the coating composition may be coated on the support through an intermediate layer such as an adhesive layer. In this invention, the intermediate layer is, for example, a layer consisting of an adhesive only or a composite layer consisting of a binder and non-magnetic fine particles, such as carbon particles, dispersed in the binder.

In the case of the intermediate layer containing carbon, a binder therefor can be freely selected from the binders of various kinds which have been described hereinbefore with reference to the magnetic layer. The particle diameter of the carbon is preferably from 10 to 50 nm, and the binder:carbon ratio by weight is preferably from 100:10 to 100:150. The thickness of the intermediate layer is preferably from 0.1 to 2 μm in the case where the intermediate layer consists of an adhesive only, and from 0.5 to 4 μm where the intermediate layer is a composite layer containing non-magnetic particles.

In addition to the above-described ingredients, a lubricating agent which is identical with or different from the lubricating agent contained in the magnetic layer may be incorporated into the intermediate layer.

The details of the above-described method for dispersing the ferromagnetic particles into the binder and method for coating the magnetic coating composition on a support are disclosed in, for example, JP-A-54-46011 and JP-A-54-21805.

By such a method, the magnetic coating composition is coated such that the resulting magnetic layer has a dry thickness generally in the range of from about 0.5 to 10 μm, preferably from 0.7 to 6.0 μm.

The magnetic layer thus formed on the non-magnetic support is subjected to a non-orientation treatment by means of a magnetic field to eliminate magnetic anisotropy. If desired and necessary, the non-orientation treatment is followed by a surface-smoothing treatment.

The magnetic disk of the present invention which shows sputtering time $T_1$, which is a sputtering time required for the carbon atom concentration to be $(C_O+C_2)/2$, in the range of from 8 to 98 minutes, has excellent running properties, such as running durability in a temperature-humidity cycle test and low-starting-torque properties, as will be described in Examples given later.

In order to obtain a magnetic disk which satisfies the above-described carbon atom concentration requirement, it is effective to incorporate, as a lubricating agent, the ester compound in which its alcohol residue or acid residue is a hydrocarbon group having a branched structure or an unsaturated double bond.

Especially where the ferromagnetic particles are ferromagnetic metal particles and the magnetic layer has a smooth surface with a small surface roughness, the effect of the present invention becomes significant. If the carbon atom concentration requirement as specified with respect to the magnetic disk of this invention cannot be satisfied, such a magnetic disk is defective in running durability and starting torque.

The present invention will been explained in more detail by reference to the following Examples, which should not be construed to be limiting the scope of the invention. In the Examples and Comparative Examples, all parts are by weight.

EXAMPLE 1

A non-magnetic coating solution for forming an intermediate layer was prepared from the following components by the method given below.

| | |
|---|---|
| Nitrocellulose | 12 parts |
| Polyurethane | 6 parts |
| (Crisvon 6119, manufactured by Dainippon Ink & Chemicals Incorporated, Japan) | |
| Electrically conductive carbon black | 5 parts |
| Mixture of methyl ethyl ketone, toluene and methyl isobutyl ketone (2/2/1 by weight) | 200 parts |

The above components were introduced into a ball mill and kneaded sufficiently, thereby preparing a coating solutin having a viscosity as measured at 25° C. of 10 poises. Thereafter, 7 parts of a polyisocyanate (Urecoat B, #1 Clear for Mylar, manufactured by Higashi Nippon Toryo Co., Ltd., Japan) were added thereto, and the resulting mixture was kneaded for 1 hour, thereby obtaining a non-magnetic coating solution with forming an intermediate layer.

The magnetic coating composition for forming a magnetic layer was prepared from the following components by the method given below.

| | |
|---|---|
| Co-doped $FeO_x$ particles | 100 parts |
| ($x = 1.4$; average particle size, 0.3 μm × 0.03 μm) | |
| Vinyl chloride copolymer | 13 parts |
| (UMCH, manufactured by UCC) | |
| Polyurethane resin | 4 parts |
| (N-2304, manufactured by Nippon Polyurethane Industry Co., Ltd., Japan) | |
| $Cr_2O_3$ (abrasive agent) | 5 parts |
| Carbon black | 5 parts |
| (Asahi #80, manufactured by Asahi Carbon Co., Ltd., Japan) | |
| Oleyl stearate | 10 parts |
| Oleic acid | 1 part |
| Myristic acid-modified silicone | 1.5 parts |
| Methyl ethyl ketone | 72 parts |
| Toluene | 72 parts |
| Methyl isobutyl ketone | 36 parts |

The above components were introduced into a ball mill and kneaded for about 10 hours to uniformly disperse the ferromagnetic particles. Thereafter, 7 parts of a polyisocyanate (Urecoat B, #1 Clear for Mylar, manufactured by Higashi Nippon Toryo Co., Ltd., Japan) were added thereto and the resulting mixture was kneaded for 1 hour, thereby obtaining a magnetic coating composition.

The thus-obtained non-magnetic coating solution for forming an intermediate layer and magnetic coating composition for forming a magnetic layer were coated, in this order, on a non-magnetic support of polyethylene terephthalate having a surface roughness (Ra) of 0.028 μm, a thickness of 75 μm and a width of 500 mm, and then dried. The resulting layered structure was then subjected to a surface-smoothing treatment by means of a calender, thereby obtaining a magnetic recording medium comprising an intermediate layer having a dry thickness of 1.8 μm and a magnetic layer having a dry thickness of 0.9 μm. The thus-obtained magnetic recording medium was cut into a magnetic disk having a diameter of 3.5 inches. Thus, a magnetic disk sample for property evaluation was prepared.

EXAMPLE 2

A magnetic disk sample was prepared under the same conditions as in Example 1 except that the amount of oleyl stearate incorporated was 15 parts.

EXAMPLE 3

A magnetic disk sample was prepared under the same conditions as in Example 1 except that a non-magnetic intermediate layer was not formed and the amount of carbon black incorporated in the magnetic coating composition was 10 parts.

EXAMPLE 4

A magnetic disk sample was prepared under the same conditions as in Example 3 except that the amount of oleyl stearate incorporated was 15 parts.

EXAMPLE 5

A magnetic disk sample was prepared under the same conditions as in Example 3 except that the amount of oleyl stearate incorporated was 20 parts.

EXAMPLE 6

A magnetic disk sample was prepared under the same conditions as in Example 3 except that 13 parts of nitrocellulose was used in place of 13 parts of vinyl chloride copolymer (UMCH, manufactured by UCC).

EXAMPLE 7

A magnetic disk sample was prepared under the same conditions as in Example 3 except that isocetyl stearate was used in place of oleyl stearate.

EXAMPLE 8

A magnetic disk sample was prepared under the same conditions as in Example 3 except that stearyl isostearate was used in place of oleyl stearate.

EXAMPLE 9

A magnetic disk sample was prepared under the same conditions as in Example 3 except that isocetyl isostearate was used in place of oleyl stearate.

EXAMPLE 10

A magnetic disk sample was prepared under the same conditions as in Example 3 except that 100 parts of ferromagnetic metal particles (consisting of 99% Fe and 1% Ni and having a specific surface area of 50 m$^2$/g, a coercive force of 15,800 Oe and a saturation magnetization of 125 emu/g) were used in place of 100 parts of Co-doped FeO$_x$ particles (x=1.4; average particle size, 0.3μm×0.03μm).

COMPARATIVE EXAMPLE 1

A magnetic disk sample was prepared under the same conditions as in Example 1 except that the amount of oleyl stearate incorporated was 5 parts.

COMPARATIVE EXPERIMENT 2

A magnetic disk sample was prepared under the same conditions as in Example 1 except that the amount of oleyl stearate incorporated was 7.5 parts.

COMPARATIVE EXAMPLE 3

A magnetic disk sample was prepared under the same conditions as in Example 1 except that the amount of oleyl stearate incorporated was 25 parts.

COMPARATIVE EXAMPLE 4

A magnetic disk sample was prepared under the same conditions as in Example 3 except that butyl isostearate was used in place of oleyl stearate used in Example 2.

COMPARATIVE EXAMPLE 5

A magnetic disk sample was prepared under the same conditions as in Example 3 except that the amount of oleyl stearate incorporated was 5 parts.

COMPARATIVE EXAMPLE 6

A magnetic disk sample was prepared under the same conditions as in Example 3 except that the amount of oleyl stearate incorporated was 25 parts.

COMPARATIVE EXAMPLE 7

A magnetic disk sample was prepared under the same conditions as in Example 10 except that the amount of oleyl stearate incorporated was 5 parts.

Each of the thus-obtained 3.5-inch magnetic disk samples was evaluated for running durability by the following temperature-humidity cycle test.

[Temperature-Humidity Cycle]

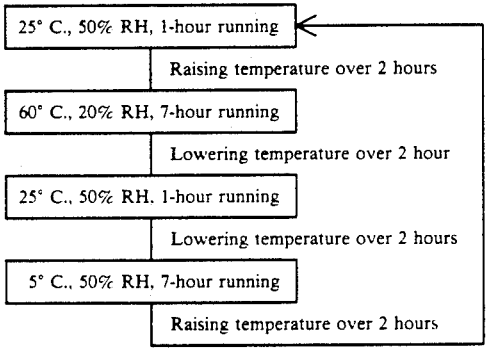

For the above-described evaluation of running durability, each of the magnetic disk samples was allowed to continuously run at 300 rpm by means of a 3.5-inch floppy disk drive (MPF 72W, manufactured by Sony Corporation, Japan), and the results of this test are shown in Table 1 in terms of the number of passes (running) which amounted until the output was decreased to 80% of the initial value.

Further, each of the magnetic disk samples was set in the above-described 3.5-inch floppy disk drive (MPF 72W, manufactured by Sony Corporation, Japan) at 40° C. and 80% RH, and then allowed to stand under these conditions for 30 minutes with the head being loaded on the sample. Thereafter, the magnetic disk sample was revolved, and the torque required for the start of the revolution was measured and is shown in Table 1 as starting torque.

In addition to the above evaluations, each of the magnetic disk samples was further evaluated for carbon atom concentration, using an Auger electron spectroscope, PHI 560 (manufactured by PERKIN ELMER Company). The conditions therefor were as follows: the electron beam-accelerating voltage was 3 kV, the beam current density was 200 mA/cm$^2$. When sputtering was performed in the direction of the depth of the magnetic layer, the Ar$^+$ ion beam-accelerating voltage was 3 kV and the beam current density was 5 mA/cm$^2$. From the data thus obtained, sputtering time T$_1$ was calculated which is a sputtering time required for the carbon atom concentration to become (C$_0$+C$_2$)/2. The concentrations of atoms of elements C, Cl, O and Fe were determined by measuring the Auger spectra of C$_{1s}$, Cl$_{1s}$, O$_{1s}$ and Fe$_{2p}$ by means of an integrating sphere, subjecting the spectral data to five-stage differentiation, reading the heights of the spectra of the respective elements (C, Cl, O and Fe), and then correcting the height values with coefficients, 0.180, 1.100, 0.500 and 0.182, respectively. The above-described measurements of Auger spectra were initiated 10 minutes after the evacuation of the sample chamber.

The results of these measurements for Examples and Comparative Examples are shown in Table 1 given below.

TABLE 1

| Sample | Sputtering Time $T_1$ (min) | Running Durability ($\times$10,000 pass) | Starting Torque (g · cm) | Surface Roughness Ra ($\mu$m) (cut of value 0.25 $\mu$m) |
|---|---|---|---|---|
| Ex. 1 | 10 | 2,000 | 48 | 0.012 |
| Ex. 2 | 26 | 2,500 | 55 | 0.009 |
| Ex. 3 | 50 | 3,000 or more | 60 | 0.015 |
| Ex. 4 | 70 | 3,000 or more | 64 | 0.011 |
| Ex. 5 | 92 | 2,400 | 85 | 0.008 |
| Ex. 6 | 60 | 3,000 or more | 50 | 0.009 |
| Ex. 7 | 35 | 3,000 or more | 53 | 0.016 |
| Ex. 8 | 41 | 3,000 or more | 62 | 0.014 |
| Ex. 9 | 31 | 3,000 or more | 52 | 0.013 |
| Ex. 10 | 45 | 3,000 or more | 70 | 0.005 |
| Com. Ex. 1 | 3 | 700 | 58 | 0.015 |
| Com. Ex. 2 | 7 | 1,400 | 55 | 0.014 |
| Com. Ex. 3 | 103 | 1,600 | 180 | 0.010 |
| Com. Ex. 4 | 2 | 250 | 52 | 0.012 |
| Com. Ex. 5 | 7 | 1,300 | 60 | 0.018 |
| Com. Ex. 6 | 113 | 1,100 | 170 | 0.011 |
| Com. Ex. 7 | 7 | 300 | 70 | 0.005 |

While the invention has been described in detail and with reference to specific embodiments thereof, it will be apparent to one skilled in the art that various changes and modifications can be made therein without departing from the spirit and scope thereof.

What is claimed is:

1. A magnetic disk comprising a non-magnetic support having provided thereon a magnetic layer comprising ferromagnetic particles, a lubricating agent and a binder resin, wherein said magnetic layer is such that when sputtering is conducted from an upper surface of said magnetic layer into the bulk of said magnetic layer in a depthwise direction of the magnetic layer by the Auger electron spectroscopic method, and the concentration of carbon atoms resulting from the sputtering is measured, a sputtering time ($T_1$) required for the carbon atom concentration to be $(C_O+C_2)/2$ is in the range of from 8 to 98 minutes, wherein $C_O$ is a carbon atom concentration value obtained at the initiation of the sputtering and $C_2$ is a carbon atom concentration value after the carbon atom concentration becomes constant, and wherein said lubricating agent is a fatty acid ester having a molecular weight of 430 or more and having an unsaturated bond or a branched structure in acid residues or alcohol residues and is present in an amount of 1 to 20 wt % based on the weight of ferromagnetic particles, and wherein said ferromagnetic particles have a specific surface area of 20 $m^2$/g or more.

2. The magnetic disk as claimed in claim 1, wherein said sputtering time ($T_1$) is in the range of from 17 to 74 minutes.

3. The magnetic disk as claimed in claim 1, wherein said lubricating agent is employed in an amount from 2 to 50 mg/$m^2$ in the case where the lubricating agent is coated on the surface of the magnetic layer to produce a top-coated magnetic recording medium.

4. The magnetic disk as claimed in claim 1, wherein the total amount of binder contained in the magnetic layer is from 10 to 100 parts by weight per 100 parts by weight of the ferromagnetic particles.

5. The magnetic disk as claimed in claim 4, wherein the total amount of binder contained in the magnetic layer is from 20 to 40 parts by weight per 100 parts by weight of the ferromagnetic particles.

6. The magnetic disk as claimed in claim 1, wherein the magnetic layer additionally comprises carbon black.

* * * * *